C. H. ROBINSON.
Velocipede.
No. 87,204.
Patented Feb. 23, 1869.
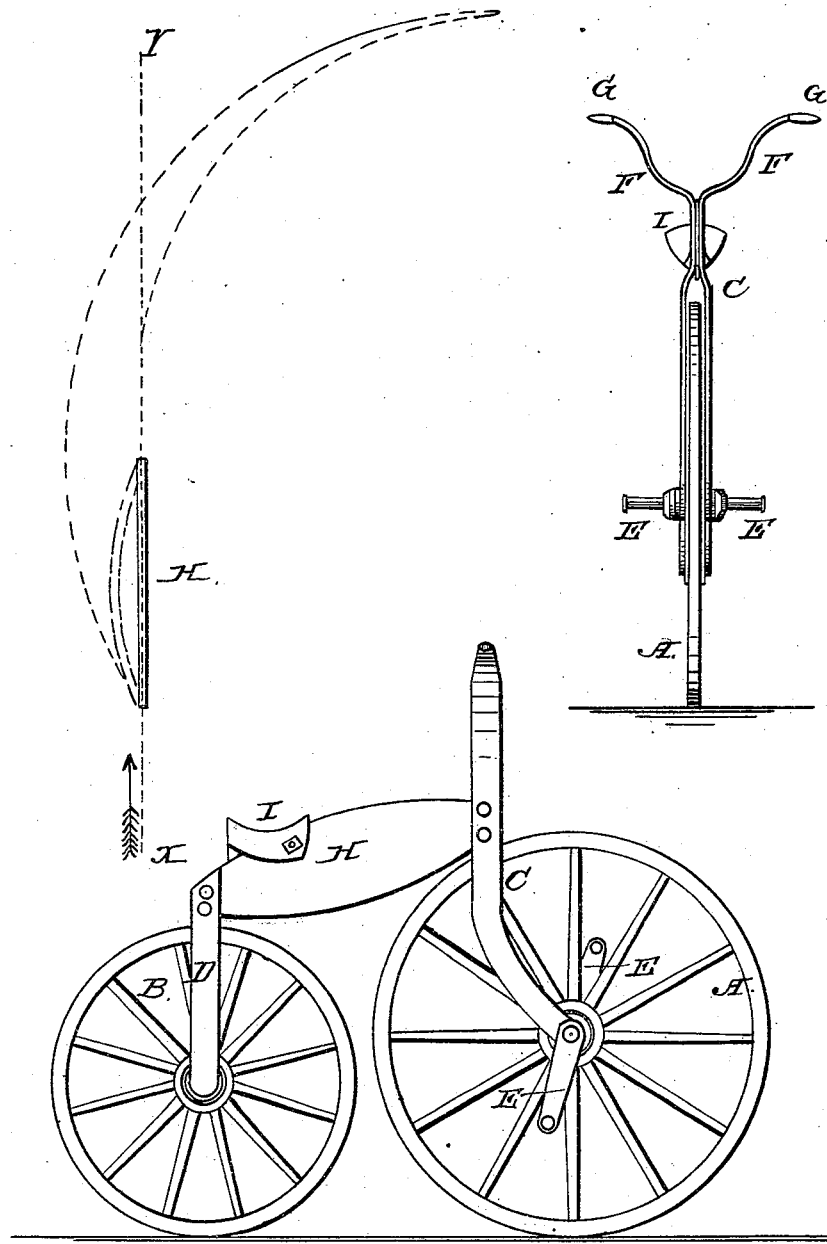

United States Patent Office.

CHARLES H. ROBINSON, OF BATH, MAINE.

Letters Patent No. 87,204, dated February 23, 1869.

IMPROVED VELOCIPEDE.

The Schedule referred to in these Letters Patent and making part of the same.

*To all whom it may concern:*

Be it known that I, CHARLES H. ROBINSON, of Bath, Sagadahoc county, in the State of Maine, have invented certain new and useful Improvements in Velocipedes; and I hereby declare the following to be a full and exact description thereof, reference being had to the accompanying drawings, forming part of this specification.

The nature or essence of my invention consists in making the perch, or the connection between the fore wheel or wheels and the hind wheel or wheels of a velocipede, elastic or flexible, so that the vehicle may be conveniently steered, without a turning-joint or pivot for that purpose, and in constructing the bracket, which holds the fore axle, of two pieces or straps, firmly fastened to the perch, and extending upward, to form the guiding-arms.

In the drawings hereinbefore mentioned—

Figure 1 is a side elevation of a bicycle, or two-wheeled velocipede, with my improvements.

Figure 2, a front elevation of the same.

In Figure 3 the direct line of motion is marked by the dotted line X Y, and the divergence of the wheels, on the bending of the perch H, is indicated in red.

In these drawings—

A is the fore wheel, and B, the hind wheel, their axles turning respectively in the brackets C and D, the axle of the fore wheel being provided with the usual pedal-cranks E E.

The straps, which form the bracket C, are riveted or bolted together, the rivets or bolts passing through both, and also through the perch H, between them, so as to secure the whole firmly together.

Above this these straps diverge, forming the guiding or steering-arms F F, which are provided with the handles G G.

The perch H, which is firmly secured to the brackets C and D, as shown in the drawings, consists of a flexible bar or plate, but may be constructed of two or more bars, of either wood or metal, forming a flexible frame.

Upon the perch H the rider's seat, or saddle I, is placed.

To turn the velocipede to the right or left, the rider will operate the arms F F, drawing one and pushing the other, so as to bend the flexible perch H, and thus give the fore wheel or wheels the direction required, but as soon as the force exerted upon the arm is intermitted or withdrawn, the vehicle will at once resume a straight course, by the elastic force of the spring-perch, and without any care or exertion on the part of the rider. As bending the perch will turn the fore and hind wheels in opposite directions, the vehicle may be turned around without deviating so far from its original line of motion as it otherwise would.

1. I claim a flexible or spring-perch, connecting the fore and hind wheels of a velocipede, substantially as and for the purposes set forth.

2. In combination with the above-claimed perch, I claim the bracket C, firmly secured to the same, and having its parts extended up to form guiding-arms, substantially as described.

CHAS. H. ROBINSON.

Witnesses:
GILMAN S. BRIGGS,
SAMUEL W. SNOW.